United States Patent [19]
Sorkin

[11] Patent Number: 5,762,300
[45] Date of Patent: Jun. 9, 1998

[54] TENDON-RECEIVING DUCT SUPPORT APPARATUS

[76] Inventor: Felix L. Sorkin, P.O. Box 1503, Stafford, Tex. 77477

[21] Appl. No.: 631,702

[22] Filed: Apr. 10, 1996

[51] Int. Cl.$^6$ ............................................. A62C 37/50
[52] U.S. Cl. ........................... 248/78; 248/72; 52/686
[58] Field of Search ......................... 248/72, 73, 679, 248/671; 285/64; 52/223.14, 679, 686, 687, 689

[56] References Cited

U.S. PATENT DOCUMENTS

| | | | |
|---|---|---|---|
| 1,296,513 | 3/1919 | Hauemeyer | 52/686 |
| 1,510,517 | 10/1924 | White | 52/679 |
| 3,228,640 | 1/1966 | Wolsh | 248/72 |
| 3,253,084 | 5/1966 | Taylor | 248/73 |
| 3,944,177 | 3/1976 | Yoda | 248/73 |
| 4,560,126 | 12/1985 | Judkins et al. | 248/72 |

Primary Examiner—Leslie A. Braun
Assistant Examiner—Willie Berry, Jr.
Attorney, Agent, or Firm—Harrison & Egbert

[57] ABSTRACT

A support apparatus for a tendon-receiving duct including a cradle for receiving an exterior surface of a duct therein and a clamp connected to the cradle and extending therebelow for attachment to an underlying object. The cradle is a generally U-shaped member having a length greater than a width of the underlying object received by the clamp. The cradle includes a pair of arms extending upwardly from a transition structure and arranged for receiving an exterior surface of the duct. The clamp includes a pair of clamp members arranged in generally transverse relationship to a longitudinal axis of the cradle. A second pair of clamp members is connected to the cradle and arranged in planar alignment with the first pair of clamp members. The cradle and the clamp are integrally formed together of a polymeric material. The underlying object to which the clamp is connected is a chair or a rebar.

3 Claims, 2 Drawing Sheets

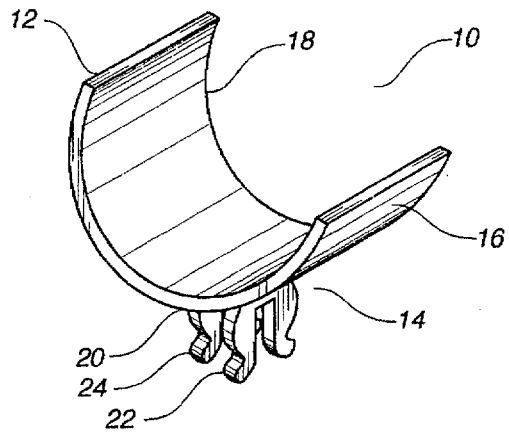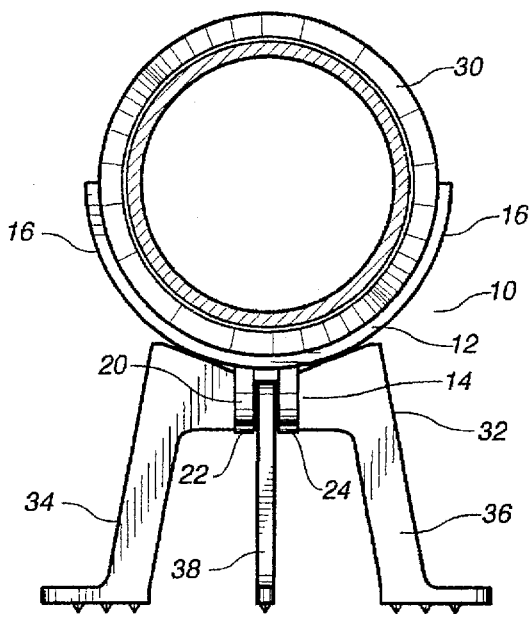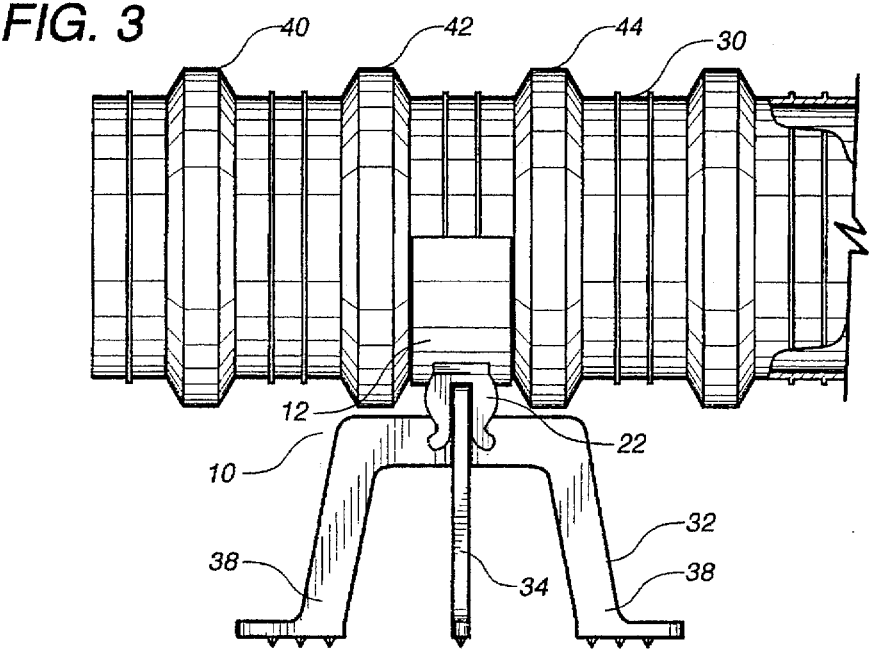

TENDON-RECEIVING DUCT SUPPORT APPARATUS

TECHNICAL FIELD

The present invention relates to post-tension systems. More particularly, the present invention relates to ducts which are used in such post-tension systems. Additionally, the present invention relates to apparatus for supporting the duct in a position above an underlying surface, such as a chair or a tendon.

BACKGROUND ART

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts, or the like, are used to capture the cable at the anchor plate and, as the Jack is removed from the tendon, to prevent its relaxation and hold it in its stressed condition.

Multi-strand tensioning is used when forming especially long post-tensioned concrete structures, or those which must carry especially heavy loads, such as elongated concrete beams for buildings, bridges, highway overpasses, etc. Multiple axially aligned strands of cable are used in order to achieve the required compressive forces for offsetting the anticipated loads. Special multi-strand anchors are utilized, with ports for the desired number of tensioning cables. Individual cables are then strung between the anchors, tensioned and locked as described above for the conventional monofilament post-tensioning system.

As with monofilament installations, it is highly desirable to protect the tensioned steel cables from corrosive elements, such as de-icing chemicals, sea water, brackish water, and even rain water which could enter through cracks or pores in the concrete and eventually cause corrosion and loss of tension of the cables. In multi-strand applications, the cables typically are protected against exposure to corrosive elements by surrounding them with a metal duct or, more recently, with a flexible duct made of an impermeable material, such as plastic. The protective duct extends between the anchors and in surrounding relationship to the bundle of tensioning cables. Flexible duct, which typically is provided in 20 to 40 foot sections is sealed at each end to an anchor and between adjacent sections of duct to provide a water-tight channel. Grout then may be pumped into the interior of the duct in surrounding relationship to the cables to provide further protection.

Chairs are commonly used in the construction industry for the support of post-tension cables, rebars, mesh and ducts above a surface. Typically, when such materials are used, they must be supported above the surface when the concrete is poured. Chairs are used with poured decks, precast work, and slab-on-grade applications. In normal use, the receiving area formed on the chair will contact and support the duct while the base of the chair rests on a deck or on a grade. When the concrete is poured, the chair will support the duct, and the tendons received therein, for a proper distance above the bottom surface.

Unfortunately, a problem affecting many construction operations is the fact that the duct is formed of a pliable plastic or metal material. Great lengths of ducts are interconnected together and supported by a large number of chairs throughout the construction operation. Since most construction chairs have relatively narrow thicknesses which are in actual contact with the duct, the chairs exert a large amount of contact pressure onto the duct. The great weight of the tendons within the ducts further exacerbates the problem of the contact pressure between the duct and the chairs. In other circumstances, careless workmen will often step on the ducts and the chairs during installation. The force of stepping on the ducts in the proximity of the chairs can cause bending, tearing, deformation, or collapsing of the duct. Whenever the duct is deformed or collapsed, there is great difficulty in extending the tendons through the entire length of the duct system. The collapsed area will interfere with the easy passage of the tendon through the duct. In other circumstances, if the duct is damaged or torn as a result of excessive contact pressure with the surface of the chairs, then the corrosion resistance of the duct system is compromised. In many circumstances, whenever the duct is damaged, expensive replacement operations are required. As such, a need has developed so as to avoid any damage to the duct from its contact with the chair or with other underlying surfaces.

When ducts are placed on the top of chairs, it is a common practice to tie the duct to the chair. Wire is often used to tie the duct to the chair. The operation of tying the duct to the chair is a tedious and time-consuming operation. Additionally, this typing procedure does nothing to eliminate the problem of contact pressure between the duct and the chair. As a result, a need has developed to provide an apparatus which eliminates the need for the tying operation and also reduces the problem of contact pressure.

It is an object of the present invention to provide a support apparatus which distributes contact pressure from the chair over a wider area of the duct.

It is another object of the present invention to provide a support apparatus for a duct that securely connects the duct to the underlying chairs.

It is a further object of the present invention to provide a support apparatus that serves to prevent damage to the ducts.

It is another object of the present invention to provide a support apparatus that eliminates the need to tie the duct to the chair.

It is a further object of the present invention to provide a support apparatus that is easy to install, easy to use, and relatively inexpensive.

These and other objects and advantages of the present invention will become apparent from a reading of the attached specification and appended claims.

SUMMARY OF THE INVENTION

The present invention is a apparatus that comprises a tendon-receiving duct, a chair for supporting the duct above an underlying surface, a cradle affixed to an exterior surface of the duct, and a clamp connected to the cradle and extending therebelow so as to be affixed to a surface of the chair.

The cradle has a generally U-shaped configuration with a first passageway extending therethrough. The duct extends through this first passageway. The clamp includes a pair of clamp members which define a second passageway therethrough. The surface of the chair is received between the first pair of clamp members. The second passageway is in transverse relationship to the first passageway.

The duct is a tubular member with corrugations extending radially outwardly therefrom. The corrugations are formed on the duct in spaced parallel relationship. The cradle is affixed to the tubular member between adjacent corrugations. In an alternative embodiment of the present invention, an indentation is formed in the cradle so as to conform to an exterior shape of the corrugations.

The clamp is affixed across a thickness of a leg of the chair. The width dimension of the cradle is greater than the thickness of the leg of the chair. In particular, the chair includes a first pair of legs which extend in a plane transverse to a longitudinal axis of the duct, and a second pair of legs extending in a plane aligned with the longitudinal axis of the duct. The clamp is affixed across a thickness of the first pair of legs. The clamp includes a first pair of clamp members which are affixed to a first pair of legs on one side of the second pair of legs, and a second pair of clamp members affixed to the first pair of legs on an opposite side of the second pair of legs.

BRIEF DESCRIPTION OF THE DRAWINGS

FIG. 1 is a perspective view of the support apparatus of the present invention.

FIG. 2 is an end view of the support apparatus of the present invention as secured to a duct and to a chair.

FIG. 3 is a side elevational view of the support apparatus of the present invention as secured to a duct and to a chair.

DETAILED DESCRIPTION OF THE INVENTION

Figure 4:
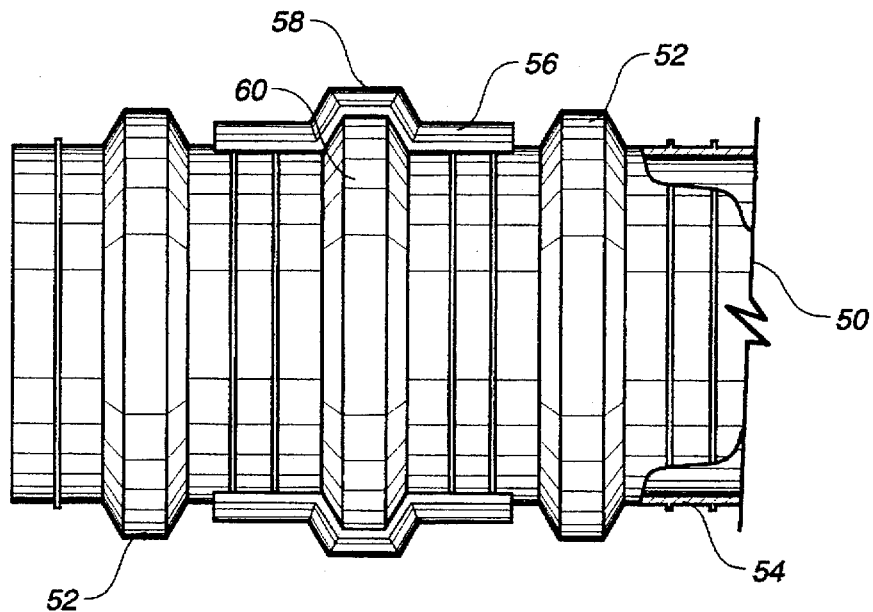
FIG. 4 is a plan view of an alternative embodiment of the support apparatus of the present invention as secured to a duct.

Referring to FIG. 1, there is shown at 10 the support apparatus in accordance with the teachings of the present invention. The support apparatus 10 includes a cradle 12 for receiving the exterior surface of a tendon-receiving duct therein. A clamp 14 is connected to the cradle 12 and extends therebelow. The clamps 14 serve to receive an underlying object therein.

In the present invention, the cradle 12 has a generally U-shaped configuration having a length dimension which is greater than the width of the underlying object which is received by the clamps 14. In particular, the cradle 12 includes a first arm 16 and a second arm 18 which extends upwardly from a transition member 20. The arms 16 and 18 are configured for contact with an exterior surface of the duct. The cradle 12 defines a first passageway extending longitudinally therethrough.

The clamp 14 includes a first pair of clamp members 22 and a second pair of clamp members 24. These clamp members 22 and 24 are arranged in generally transverse relationship to the longitudinal axis of the cradle 12. The second pair of clamp members 24 is arranged in generally planar alignment with the first pair of clamp members 22. The first pair of clamp members 22 define a second passageway passing therethrough. This second passageway is transverse to the first passageway of the cradle 12. The cradle 12 and the pairs of clamp members 22 and 24 are integrally formed together of a polymeric material.

FIG. 2 shows how the support apparatus 10 is used so as to support a duct 30 in a proper position above a chair 32. The duct 30 is a tubular member which receives the plurality of tendons extending longitudinally therethrough. In FIG. 2, it can be seen that the arms 16 and 18 of the cradle 12 receive an exterior surface of the duct 30. Each of the arms 16 and 18 extends upwardly from the transition structure 20 around the exterior of the duct 30. In the embodiment of the inventions shown in FIG. 2, the arms 16 and 18 extend upwardly around more than 180° of the circumference of the duct 30.

The chair 32 has a first pair of legs 34 and 36 in planar alignment generally transverse to the longitudinal axis of the duct 30. The chair 32 also includes a second pair of legs 38 which are in planar alignment and also aligned with the longitudinal axis of the duct 30. As can be seen, the clamp members 22 are affixed across a thickness of the leg 34 on one side of the legs 38. The second clamp members 24 are affixed to the leg 36 on an opposite side of the legs 38. Each of the clamp members 22 and 24 is affixed across the thickness of the legs 34 and 36, respectively.

FIG. 3 illustrates further how the support apparatus 10 of the present invention serves to hold a duct 30 in a proper position above the chair 32. In FIG. 3, it can be seen that the duct 30 is a tubular member with corrugations 40 extending radially outwardly therefrom. The corrugations 40 are positioned in spaced parallel relationship along the length of the duct 30.

The cradle 12 receives an exterior surface of the duct 30 between corrugations 42 and 44. As can be seen, the cradle 12 has a length dimension which extends between the corrugations 42 and 44. This length dimension is greater than the thickness of the legs 34 and 36. Stated otherwise, the length of the cradle 12 is greater than the width of the passageway between the clamp means. As such, the cradle 12 serves to distribute contact pressure over a greater surface area of duct 30 than would normally occur if the duct were supported directly upon the top of the legs of the chair 32. As can be seen in FIG. 3, the clamp members 22 are affixed onto the legs 34. The clamp members 22 extend across the thickness of the legs 34.

The chair which is illustrated in FIGS. 2 and 3 is a product of General Technologies, Inc. of Stafford, Tex. This chair is the subject of U.S. application Ser. No. 08/372,053 by the present inventor. Although this chair is illustrated in the figures of the present application, the support apparatus 10 of the present invention can be used equally well with other types of construction chairs. The clamp members 22 and 24 should have a suitable resiliency and size so as to grasp the chair legs of various thicknesses.

FIG. 4 shows an alternative embodiment of the present invention for use in conjunction with oval or flat ducts. As can be seen, duct 50 has a plurality of corrugations 52 which extend radially outwardly of the tubular member 54 of the duct 50. The cradle 56 of this alternative embodiment includes an indentation 58. Indentation 58 conforms to the exterior shape of the corrugation 60. When the cradle 56 is placed around the exterior of the duct 50, the corrugation 60 will reside within the indentation 58 of the cradle 56. This configuration can also be adapted for use with the corrugations of round ducts. The purpose of the cradle 56 with the indentation 58 is to avoid damage to the corrugations 52 on the duct 50. The distribution of contact pressure area over a wider surface area of the duct 50 is accomplished through the use of the cradle 56. In all other respects, the embodiment of the support apparatus shown in FIG. 4 is similar to that of the previous embodiments.

Figure 5:
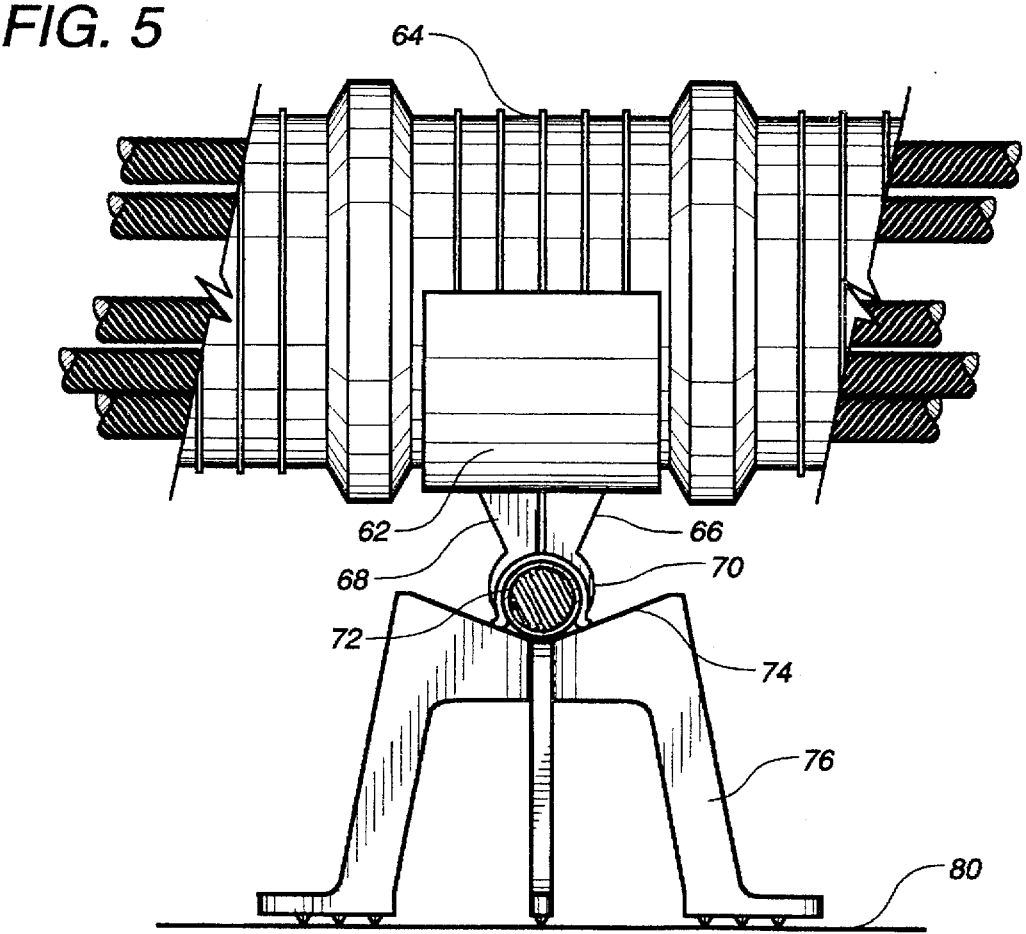
FIG. 5 is another alternative embodiment of the present invention in which the support apparatus is secured to a duct and to an underlying tendon.

FIG. 5 shows a further alternative embodiment 60 of the support apparatus of the present invention. In the embodiment shown in FIG. 5, a cradle 62 is affixed to an exterior surface of a duct 64 in the manner described herein previously. A plurality of tendons 73 extending through the duct 64. A clamp member 66 extends downwardly below the cradle 62. The clamp 66 includes a first clamp arm 68 and a second clamp arm 70 receiving the exterior surface of a rebar 72. The rebar 72 is supported in a receiving area 74 of a chair 76. Under certain circumstances, the duct 64 extends transverse to an underlying tendon 72 or an underlying duct. As shown in FIG. 5, the duct 64 will extend transverse to a tendon 72. Under normal circumstances, it would be a potential for damage to the duct 64 by its contact pressure with an exterior surface of the tendon 72 or with the tops of the legs of the chair 76. The use of the support apparatus 60 of the present invention assures that the duct 64 is supported above the tendon 72 and that the contact pressure of support is distributed over a wider surface area by the use of cradle 62. As can be seen in FIG. 5, the chair 76 resides on an underlying surface 80.

The present invention achieves many advantages in the field of construction practice. First, and foremost, damage to the ducts is avoided by distributing the contact pressure area over a wider surface area of the duct. As such, damage to the duct is avoided even though the workmen may step on the exterior surface of the duct and even though the tendons exert a great deal of pressure downwardly. Additionally, the support apparatus of the present invention further serves to secure the duct to the chair. The use of the support apparatus of the present invention can avoid the need for tying or other practices which could potentially damage the surface of the duct. Instead of tying the duct to the receiving area of the chair, a workman can simply affix the cradle to the exterior surface of the duct and affix the clamp members to the legs of the chair. This greatly reduces installation time. Since the components of the support apparatus of the present invention are integrally formed of a polymeric material, the support apparatus is relatively inexpensive. The configuration of this support apparatus is adaptable to a wide range of duct and chair shapes and sizes.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. An apparatus comprising:

a tendon-receiving duct;

a chair means for supporting said duct above an underlying surface, said chair means comprising:

a first pair of legs extending in a plane transverse to a longitudinal axis of said duct; and a second pair of legs extending in a plane aligned with the longitudinal axis of said duct;

a cradle receiving an exterior surface of said duct, said cradle having a length dimension extending along a portion of a length of said duct, and a clamp connected to said cradle and extending therebelow, said clamp being affixed across a thickness of said first pair of legs.

2. The apparatus of claim 1, said clamp comprising:

a first pair of clamp members affixed to one of said first pair of legs on one side of said second pair of legs; and a second pair of legs clamp members affixed to another of said first pair of legs on an opposite side of said second pair of legs.

3. An apparatus comprising:

a tendon-receiving duct having a plurality of tendons extending therethrough, said tendon-receiving duct being formed of a polymeric material;

a cradle affixed to an exterior surface of said duct, said cradle defining a first passageway extending therethrough, said duct extending through said first passageway;

a clamp connected to said cradle and extending therebelow, said clamp defining a second passageway extending therethrough, said second passageway being in transverse relationship to said first passageway;

a rebar extending below said duct in generally transverse relationship therewith, said clamp being affixed to an exterior surface of said rebar, said rebar extending through said second passageway; and a chair having a receiving area formed on a top surface thereof and a plurality of leas extending downwardly from said receiving area, said rebar being supported within said receiving area.

* * * * *